US009394043B2

(12) United States Patent
Riski et al.

(10) Patent No.: US 9,394,043 B2
(45) Date of Patent: Jul. 19, 2016

(54) PROPULSION SYSTEM FOR AQUATIC VESSELS

(71) Applicant: Norsepower Oy, Helsinki (FI)

(72) Inventors: Tuomas Riski, Helsinki (FI); Kai Levander, Turku (FI)

(73) Assignee: Norsepower Oy, Helsinki (FI)

( * ) Notice: Subject to any disclaimer, the term of this patent is extended or adjusted under 35 U.S.C. 154(b) by 0 days.

(21) Appl. No.: 14/897,300

(22) PCT Filed: Jun. 16, 2014

(86) PCT No.: PCT/FI2014/000011
§ 371 (c)(1),
(2) Date: Dec. 10, 2015

(87) PCT Pub. No.: WO2015/001171
PCT Pub. Date: Jan. 8, 2015

(65) Prior Publication Data
US 2016/0121986 A1      May 5, 2016

(30) Foreign Application Priority Data

Jul. 4, 2013  (GB) .................................. 1312053.0

(51) Int. Cl.
*G05D 1/00* (2006.01)
*B63B 35/00* (2006.01)
(Continued)

(52) U.S. Cl.
CPC ............... *B63H 9/02* (2013.01); *G05D 1/0206* (2013.01); *B63B 49/00* (2013.01); *B63H 21/213* (2013.01)

(58) Field of Classification Search
USPC ............. 114/39.29, 39.3; 440/79; 290/44, 55; 60/398; 703/3; 416/4
See application file for complete search history.

(56) References Cited

U.S. PATENT DOCUMENTS 4,582,013 A * 4/1986 Holland, Jr. ............. B63H 9/02
114/39.3
8,174,135 B1 * 5/2012 Roe ......................... F03B 13/16
290/43
(Continued)

FOREIGN PATENT DOCUMENTS

BM      2723632 A2 * 4/2014 ............... B63H 9/02
CN    103906680 A  *  7/2014 ............... B36H 9/02
(Continued)

OTHER PUBLICATIONS

Modeling of flow around a wind rotor HAWT Application to the dynamic stall; A. Nouioua; R. Dizene; Renewable and Sustainable Energy Conference (IRSEC), 2014 International; Year: 2014; pp. 827-830, DOI: 10.1109/IRSEC.2014.7059768.*

(Continued)

*Primary Examiner* — Cuong H Nguyen
(74) *Attorney, Agent, or Firm* — Ziegler IP Law Group, LLC

(57) ABSTRACT

A propulsion system for an aquatic vessel is provided. The propulsion system includes one or more Magnus-type rotors that are operable to rotate about their respective substantially upright axes. The propulsion system also includes a drive arrangement for rotating the Magnus-type rotors, and a control arrangement for receiving one or more measured apparent wind speeds and for controlling the drive arrangement to vary a rate of rotations of each of the Magnus-type rotors, for example, as a function of the measured apparent wind speeds. Moreover, the control arrangement is additionally provided in operation with future route information for the aquatic vessel, together with weather forecast information for use in controlling the drive arrangement for improving propulsion provided by the Magnus-type rotors.

23 Claims, 5 Drawing Sheets

(51) Int. Cl.
  *B63H 9/02*    (2006.01)
  *G05D 1/02*    (2006.01)
  *B63B 49/00*    (2006.01)
  *B63H 21/21*    (2006.01)

(56) References Cited

U.S. PATENT DOCUMENTS

| | | | | |
|---|---|---|---|---|
| 8,362,631 | B2* | 1/2013 | Roe | F03B 13/16 290/43 |
| 8,746,162 | B2* | 6/2014 | Holohan | B63H 9/02 114/102.29 |
| 8,875,643 | B2* | 11/2014 | Rohden | B63H 9/02 114/39.3 |
| 2012/0091717 | A1* | 4/2012 | Roe | F03B 13/16 290/53 |
| 2012/0211987 | A1* | 8/2012 | Roe | F03B 13/16 290/53 |
| 2013/0042798 | A1* | 2/2013 | Holohan | B63H 9/02 114/39.3 |
| 2013/0220191 | A1* | 8/2013 | Rohden | B63H 9/02 114/39.3 |
| 2013/0243593 | A1 | 9/2013 | Rohden | |
| 2013/0291775 | A1* | 11/2013 | Wobben | B63H 9/02 114/39.3 |
| 2014/0196648 | A1* | 7/2014 | Holohan | B63H 9/02 114/39.3 |

FOREIGN PATENT DOCUMENTS

| | | | | |
|---|---|---|---|---|
| JP | 2014516874 W | * | 7/2014 | ............ Y02T 70/58 |
| JP | 5805314 B2 | * | 11/2015 | ............ Y02T 70/58 |
| KR | 2014024469 A | * | 2/2014 | ............ Y02T 70/58 |
| WO | 2012178006 A2 | | 12/2012 | |
| WO | WO 2012178006 A2 | * | 12/2012 | ............ B63H 9/02 |
| WO | WO 2012178006 A3 | * | 3/2013 | ............ B63H 9/02 |

OTHER PUBLICATIONS

A simulation study on airfoils using VAWT design for low wind speed application; P. D. A. Aziz; A. K. R. Mohamad; F. Z. Hamidon; N. Mohamad; N. Salleh; N. M. Yunus; Engineering Technology and Technopreneuship (ICE2T), 2014 4th International Conference on; Year: 2014; pp. 105-109, DOI: 10.1109/ICE2T.2014.7006228.*

Sea breeze, coastal upwelling modeling to support offshore wind energy planning and operations; Greg Seroka; Travis Miles; Rich Dunk; Josh Kohut; Scott Glenn; Erick Fredj; Oceans 2015—MTS/IEEE Washington; Year: 2015.*

Advanced route optimization in ship navigation; Ei-ichi Kobayashi; Syouta Yoneda; Atsushi Morita; Simulation and Modeling Methodologies, Technologies and Applications (SIMULTECH), 2014 International Conference on; Year: 2014; pp. 572-577, DOI: 10.5220/0005033805720577.*

International Search Report for PCT No. PCT/FI2014/000011, mailed Oct. 10, 2014, 12 pages.

GB Search Report for GB1312053.0, Nov. 20, 2013, 1 page.

* cited by examiner

PROPULSION SYSTEM FOR AQUATIC VESSELS

FIELD OF THE INVENTION

The present invention generally relates to propulsion systems for aquatic vessels, and more specifically, to propulsion systems that use Magnus-type rotors for propelling aquatic vessels. Moreover, the present invention relates to methods of operating the propulsion systems for the aquatic vessels. Furthermore, the present invention also relates to software products recorded on non-transitory machine-readable data storage media, wherein the software products are executable upon computing hardware to implement the aforesaid methods.

BACKGROUND OF THE INVENTION

In early 1920's, a German engineer, Anton Flettner, invented Magnus rotors that used a Magnus effect to propel an aquatic vessel. The Magnus effect may be defined as a thrust acting on a rotating body in a moving airstream, such as wind, wherein the thrust acts perpendicularly to a direction of the moving airstream.

The Magnus rotors were not received well by mariners of that era, as fuel was inexpensive and the mariners preferred to use standard marine propellers in preference to the Magnus rotors.

However, with passing time, fuel prices have increased rapidly and considerably, for reasons of "peak oil" (ref. Hubbert peak theory by Marion King Hubbert) and increasing demand as the World's population presently increases in a substantially exponential and uncontrollable manner. Today, the marine industry is making new attempts to harvest wind power to supplement standard marine propellers to propel aquatic vessels.

Typically, a thrust generated by a Magnus rotor depends on a rate and a direction of rotations of the Magnus rotor relative to an apparent speed and an apparent direction of wind. As wind conditions change regularly during a course of a journey of an aquatic vessel, the rate of rotations of the Magnus rotor needs to be adjusted repeatedly with changing wind conditions in order to maximise propulsion from the Magnus rotor.

The terms "apparent wind speed" and "apparent wind direction" refer to wind speed and direction as observed from an aquatic vessel in motion. In case when the aquatic vessel is stationary, the apparent wind speed and the apparent wind direction are the same as the wind speed and the wind direction in relation to Earth or a fixed object. Measurement of the apparent wind speed can be done technically by employing an anemometer and/or other wind sensors. The wind speed and direction in respect to the fixed object or Earth can be calculated from the measured apparent wind by taking in account speed and direction of the aquatic vessel.

A conventional propulsion system for adjusting a rate of rotations of a Magnus rotor has been provided in U.S. Pat. No. 8,230,798. The rate of rotations of the Magnus rotor is adjusted, based on an apparent wind speed measured with an anemometer. The apparent wind speed is taken as a mean apparent wind speed for a specified period of time.

Another conventional propulsion system for adjusting the rate of rotations has been provided in Canadian patent application no. CA2811249. The patent application discloses a ship with multiple Magnus rotors. The rate of rotations of the Magnus rotors is adjusted, based on the measured apparent wind speed and the measured apparent wind direction, a predetermined destination of the ship and/or navigation information.

However, these conventional propulsion systems suffer from a number of disadvantages. Firstly, rotating parts of the Magnus rotors may be large in size and may weigh from a few tonnes to several tonnes. Therefore, adjusting the rate of rotations of the Magnus-type rotors, namely a rotational energy of the rotating parts, may require a large amount of energy. Secondly, the rate of rotations is adjusted based on the apparent wind speed and the apparent wind direction measured at a current time. Therefore, a lesser amount of time is available to the conventional propulsion systems for adjusting the rate of rotations. This, in turn, increases power consumption of the conventional propulsion systems considerably. Moreover, this may pose additional problems in cases where wind conditions change rapidly.

In light of the foregoing discussion, there exists a need for a propulsion system for an aquatic vessel that is capable of facilitating an improvement in propulsion, while reducing associated power consumption, as compared to known conventional propulsion systems.

SUMMARY OF THE INVENTION

The present invention seeks to provide a propulsion system for an aquatic vessel.

The present invention also seeks to provide a method of operating a propulsion system for an aquatic vessel.

In one aspect, embodiments of the present invention provide a propulsion system for an aquatic vessel. The propulsion system includes one or more Magnus-type rotors and a drive arrangement for rotating the Magnus-type rotors. The propulsion system also includes a control arrangement for controlling the drive arrangement to vary a rate and/or a direction of rotations of each of the Magnus-type rotors.

The Magnus-type rotors are operable to rotate about their respective substantially upright axes, thereby producing a Magnus effect to propel the aquatic vessel.

Beneficially, the Magnus-type rotors may have a suitable shape and size. For example, the Magnus-type rotors may be spherical, ellipsoidal or cylindrical in form. Additionally, the Magnus-type rotors may have an elongate length in a range of 12 meters to 36 meters, and a diameter in a range of 2 meters to 6 meters.

Further, the control arrangement is operable to receive one or more measured apparent wind speeds and/or one or more measured apparent wind directions.

For this purpose, the propulsion system optionally includes one or more sensors for measuring one or more of:
(a) the rate of rotations of each of the Magnus-type rotors,
(b) the direction of rotations of each of the Magnus-type rotors,
(c) an angular acceleration and/or deceleration of each of the Magnus-type rotors,
(d) a power applied to the drive arrangement to rotate each of the Magnus-type rotors,
(e) a thrust generated by each of the Magnus-type rotors,
(f) an apparent speed and/or an apparent direction of wind,
(g) a speed and/or direction of the aquatic vessel, and/or
(h) a geographical location of the aquatic vessel.

The sensors may be operable to generate one or more corresponding measurement signals including, inter alia, the measured apparent wind speeds and the measured apparent wind directions. The sensors may then be operable to send the corresponding measurement signals to the control arrangement to use when controlling the drive arrangement to vary the rate and/or direction of rotations of each of the Magnus-type rotors.

Moreover, the control arrangement is additionally provided in operation with one or more forecasted wind speeds and/or one or more forecasted wind directions. The forecasted wind speeds and/or the forecasted wind directions may, for example, be communicated to the control arrangement via a satellite communication link.

Moreover, the control arrangement is additionally provided in operation with future route information for the aquatic vessel. The future route information may, for example, include a route to be used by the aquatic vessel.

Moreover, the control arrangement is supplemented with one or more predicted wind speeds and/or one or more predicted wind directions derived from one or more weather models for use in controlling the drive arrangement for improving propulsion provided by the Magnus-type rotors. The weather models are operable to determine the predicted wind speeds and/or the predicted wind directions depending on the measured apparent wind speeds and/or the measured apparent wind directions and the forecasted wind speeds and/or the forecasted wind directions.

The weather models are optionally operable to divide the route into a plurality of route segments. Beneficially, these weather models may be operable to determine the predicted wind speeds and/or the predicted wind directions for one or more route segments from the plurality of route segments.

Accordingly, the weather models are optionally operable to compare the measured apparent wind speeds and/or the measured apparent wind directions with the forecasted wind speeds and/or the forecasted wind directions for current and/or past geographical locations of the aquatic vessel, to improve predictions for future geographical locations of the aquatic vessel along the route.

Beneficially, the weather models are optionally operable to vary the predicted wind speeds and/or the predicted wind directions within a route segment as a function of place in the route segment and/or as a function of time.

Furthermore, the control arrangement is optionally operable to predict rates of rotations of the Magnus-type rotors to be used along the route, using a target vessel speed, the predicted wind speeds and/or the predicted wind directions, in a manner that the propulsion provided by the Magnus-type rotors is improved. Beneficially, the rates of rotations to be used are predicted in advance, thereby allowing the control arrangement to have ample time to control the drive arrangement for varying the rate of rotations of each of the Magnus-type rotors.

In some examples, the control arrangement may be operable to control the drive arrangement to not accelerate or only partly accelerate the rate of rotations, when a total power required to accelerate the rate of rotations is higher than a predefined threshold value.

As the control arrangement has ample time, power consumed in varying the rates of rotations is substantially reduced. This potentially results in an increase in the efficiency of the propulsion system.

In another aspect, embodiments of the present invention provide a method of operating the propulsion system for the aquatic vessel.

In yet another aspect, embodiments of the present invention provide a software product recorded on non-transitory machine-readable data storage media, wherein the software product is executable upon computing hardware for implementing the method of operating the propulsion system for the aquatic vessel.

Embodiments of the present invention substantially eliminate the aforementioned problems in the prior art, and facilitate improvement in propulsion provided by the propulsion system for the aquatic vessel, while reducing the power consumption and the fuel consumption of the aquatic vessel.

Additional aspects, advantages, features and objects of the present invention would be made apparent from the drawings and the detailed description of the illustrative embodiments construed in conjunction with the appended claims that follow.

It will be appreciated that features of the present invention are susceptible to being combined in various combinations without departing from the scope of the present invention as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present invention, exemplary constructions of the disclosure are shown in the drawings. However, the present invention is not limited to specific methods and instrumentalities disclosed herein. Moreover, those in the art will understand that the drawings are not to scale. Wherever possible, like elements have been indicated by identical numbers.

Embodiments of the present invention will now be described, by way of example only, with reference to the following diagrams wherein.

Figure 1:
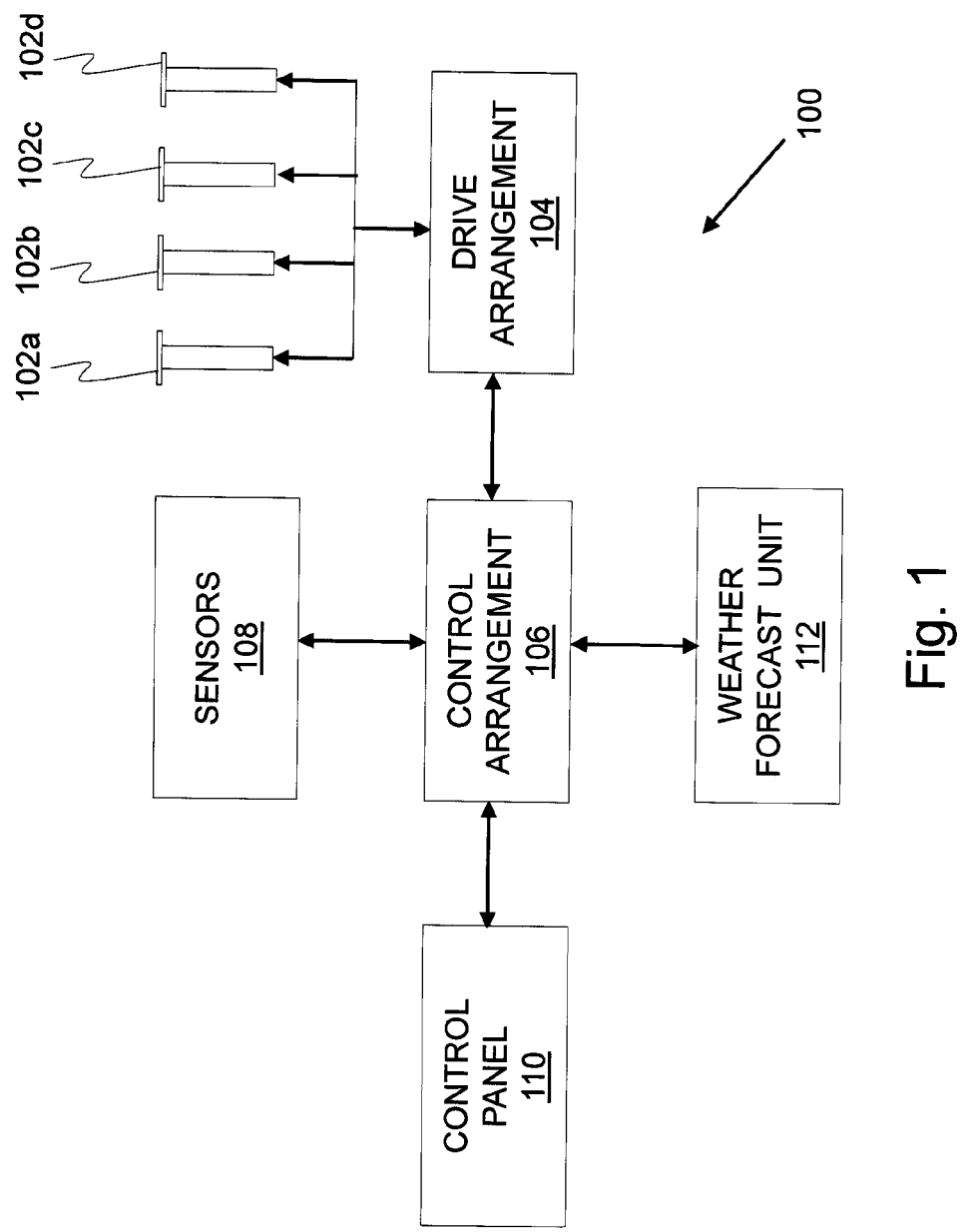
FIG. 1 is a schematic illustration of a propulsion system for an aquatic vessel, in accordance with an embodiment of the present invention.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS OF THE INVENTION

The following detailed description illustrates embodiments of the present invention and ways in which it can be implemented. Although the best mode of carrying out the present invention has been disclosed, those in the art would recognize that other embodiments for carrying out or practicing the present invention are also possible.

Embodiments of the present invention provide a propulsion system for an aquatic vessel. The propulsion system includes one or more Magnus-type rotors and a drive arrangement for rotating the Magnus-type rotors. The propulsion system also includes a control arrangement for receiving one or more measured apparent wind speeds and for controlling the drive arrangement to vary a rate of rotations of each of the Magnus-type rotors, for example, as a function of the measured apparent wind speeds.

The Magnus-type rotors are operable to rotate about their respective substantially upright axes, thereby producing a Magnus effect to propel the aquatic vessel. The Magnus effect may be defined as a thrust acting on a rotating body in a moving airstream, such as wind, wherein the thrust acts perpendicularly to the direction of the moving airstream.

In order to produce the Magnus effect, the Magnus-type rotors may have a suitable shape and size. For example, the Magnus-type rotors may be spherical, ellipsoidal or cylindrical in form. The Magnus-type rotors may have an elongate length in a range of 12 meters to 36 meters, and a diameter in a range of 2 meters to 6 meters.

Further, the control arrangement is operable to receive one or more measured apparent wind directions, and take into account the measured apparent wind directions when controlling the drive arrangement for varying a direction of rotations of each of the Magnus-type rotors.

Accordingly, the propulsion system may include one or more sensors for measuring one or more of:
(a) the rate of rotations of each of the Magnus-type rotors,
(b) the direction of rotations of each of the Magnus-type rotors,
(c) an angular acceleration and/or deceleration of each of the Magnus-type rotors,
(d) a power applied to the drive arrangement to rotate each of the Magnus-type rotors,
(e) a thrust generated by each of the Magnus-type rotors,
(f) an apparent speed and/or an apparent direction of wind,
(g) a speed and/or direction of the aquatic vessel, and/or
(h) a geographical location of the aquatic vessel.
For this purpose, the sensors may, for example, include one or more accelerometers, one or more strain gauges, one or more anemometers, and/or one or more Global Positioning System (GPS) sensors.

The sensors may be operable to generate one or more corresponding measurement signals including, inter alia, the measured apparent wind speeds and the measured apparent wind directions. The sensors may then be operable to send the corresponding measurement signals to the control arrangement to use when controlling the drive arrangement to vary the rate and/or direction of rotations of each of the Magnus-type rotors.

Moreover, the control arrangement is additionally provided in operation with future route information for the aquatic vessel, together with weather forecast information for use in controlling the drive arrangement. The future route information may, for example, be provided to the control arrangement beforehand. The weather forecast information may, for example, be communicated to the control arrangement via a satellite communication link.

For example, the future route information and the weather forecast information may be provided to the control arrangement well in advance. This may enable the control arrangement to determine the rate and/or direction of rotations of each of the Magnus-type rotors in such a manner that propulsion provided by the Magnus-type rotors is improved, while power consumption is reduced.

Moreover, the control arrangement may be supplemented with local weather information derived from one or more weather models hosted in computing hardware of the control arrangement for use in controlling the drive arrangement. The weather models may be operable to divide the future route information into a plurality of route segments. Beneficially, these weather models may be operable to predict weather conditions for one or more route segments, for example from the plurality of route segments.

Embodiments of the present invention are suitable for aquatic vessels such as passenger ships, cargo ships, special-purpose ships, and boats, but not limited thereto.

Referring now to the drawings, particularly by their reference numbers, FIG. 1 is a schematic illustration of a propulsion system 100 for an aquatic vessel, in accordance with an embodiment of the present invention. The propulsion system 100 includes one or more Magnus-type rotors, depicted as a Magnus-type rotor 102a, a Magnus-type rotor 102b, a Magnus-type rotor 102c and a Magnus-type rotor 102d (hereinafter collectively referred to as Magnus-type rotors 102). The propulsion system 100 also includes a drive arrangement 104, a control arrangement 106, one or more sensors 108, a control panel 110 and a weather forecast unit 112. In order to perform their respective operations, various components of the propulsion system 100 may receive electricity from an electric grid (not shown in FIG. 1) of the aquatic vessel.

The Magnus-type rotors 102 may be spatially positioned at various portions of a deck of the aquatic vessel. For example, the Magnus-type rotors 102 may be spatially positioned in a proximity of corners of the deck, namely, port and starboard sides of a bow and a stern of the aquatic vessel. Alternatively, the Magnus-type rotors 102 may be spatially positioned in proximity of a middle portion of the deck or the stern or the bow. The Magnus-type rotors 102 may be suitably positioned depending on, for example, a number of the Magnus-type rotors 102 that have been set up on the deck of the aquatic vessel, a size of the Magnus-type rotors 102, and/or a size and/or an aerodynamic shape of the aquatic vessel.

The drive arrangement 104 includes one or more drives (not shown in FIG. 1) that are attached to the Magnus-type rotors 102. These drives are operable to rotate the Magnus-type rotors 102 about their respective substantially upright axes. Beneficially, the drive arrangement 104 may include a drive corresponding to each of the Magnus-type rotors 102, so as to be operable to individually actuate the drive to vary a rate of rotations of its respective Magnus-type rotor independent of other Magnus-type rotors. Details of such a drive have been provided in conjunction with FIG. 2.

Optionally, the drive arrangement 104 may be operable to employ regenerative braking for the Magnus-type rotors 102, for example, when their rates of rotations are to be adjusted in operation. For example, power regenerated by one of the Magnus-type rotors 102 as a result of deceleration may be optionally transferred via the electrical grid of the aquatic vessel, and used to accelerate other of the Magnus-type rotors 102 and/or used to recharge an energy storage arrangement coupled to the electric grid of the aquatic vessel for future use in increasing rates of rotation of the Magnus-type rotors 102.

The drive arrangement 104 is coupled with the control arrangement 106, which is operable to control the drive arrangement 104 to vary the rate of rotations of each of the Magnus-type rotors 102. The control arrangement 106 may, for example, be spatially implemented using one or more computing devices that include computing hardware, which are operable to execute one or more software products recorded on non-transitory machine-readable data storage media. Typical examples of the computing devices include, although are not limited to, a Personal Computer (PC), a Handheld PC, a desktop computer, a laptop computer, a tablet computer, a phablet computer, an Ultra-Mobile Personal Computer (UMPC), and a smart telephone.

The control arrangement 106 is also coupled with the sensors 108. For example, one or more of the sensors 108 may be coupled with the control arrangement 106 via National Marine Electronics Association (NMEA) buses.

The sensors 108 may be operable to measure one or more of (a) the rate of rotations of each of the Magnus-type rotors 102,
(b) a direction of rotations of each of the Magnus-type rotors 102,
(c) an angular acceleration and/or deceleration of each of the Magnus-type rotors 102,
(d) a power applied to the drive arrangement 104 to rotate each of the Magnus-type rotors 102,
(e) a thrust generated by each of the Magnus-type rotors 102,
(f) an apparent speed and/or an apparent direction of wind (hereinafter referred to as "apparent wind speed" and "apparent wind direction"),
(g) a speed and/or direction of the aquatic vessel (hereinafter referred to as "vessel speed" and "vessel direction"), and/or
(h) a geographical location of the aquatic vessel (hereinafter referred to as "vessel location").

The sensors 108 may, for example, include one or more accelerometers, one or more strain gauges, one or more anemometers and/or one or more GPS sensors. Additionally, the sensors 108 may provide information from an electronic logbook of the aquatic vessel, and/or trim information of the aquatic vessel.

One or more sensors from amongst the sensors 108 may be spatially positioned on the Magnus-type rotors 102. While other sensors from amongst the sensors 108 may be spatially positioned in a local proximity of the Magnus-type rotors 102, for example, to facilitate measurement of the apparent wind speed and the apparent wind direction in the local proximity of the Magnus-type rotors 102.

The sensors 108 may be operable to generate one or more corresponding measurement signals including, inter alia, one or more measured apparent wind speeds, one or more measured vessel speeds, one or more measured apparent wind directions and one or more measured vessel directions. These measurement signals may, for example, be generated as a function of time. The sensors 108 may then be operable to send the corresponding measurement signals to the control arrangement 106.

Upon receiving the measurement signals, the control arrangement 106 may be operable to determine one or more wind speeds and/or one or more wind directions relative to Earth or a fixed object, from the measured apparent wind speeds, the measured vessel speeds, the measured apparent wind directions and the measured vessel directions, for example, using vector analysis.

Consequently, the control arrangement 106 is operable to control the drive arrangement 104 to vary the rate of rotations of each of the Magnus-type rotors 102 as a function of the measured apparent wind speeds. In addition, the control arrangement 106 is operable to take into account the measured apparent wind directions when controlling the drive arrangement 104 for varying the direction of rotations of each of the Magnus-type rotors 102.

Moreover, the control arrangement 106 is also coupled with the control panel 110. For example, the control arrangement 106 may be coupled with the control panel 110 via NMEA buses.

The control arrangement 106 may be configured to communicate with the control panel 110, which may, for example, be operable to provide the control arrangement 106 with future route information for the aquatic vessel. The future route information may, for example, include detailed navigation instructions including one or more proposed routes that may be used by the aquatic vessel to reach its destination and/or one or more proposed vessel speeds to be used.

Additionally, the control panel 110 may be used by a crew of the aquatic vessel to control and/or monitor various operations of the aquatic vessel, for example, including operations performed by the propulsion system 100. Beneficially, the control panel 110 may be spatially positioned in a bridge of the aquatic vessel from where the crew of the aquatic vessel may conveniently provide inputs to or receive outputs from the control arrangement 106. For example, the control panel 110 may be operable to provide the crew with information pertaining to the vessel and/or the propulsion system 100, such as a route taken by the aquatic vessel, a current location of the aquatic vessel, the vessel speed, the vessel direction, and/or a power consumed by the propulsion system 100.

Moreover, the control arrangement 106 may be communicably coupled with a weather forecast unit 112. In some cases, the control arrangement 106 may be communicably coupled with the weather forecast unit 112 indirectly, for example, via the control panel 110.

The weather forecast unit 112 may be operable to provide the control arrangement 106 with weather forecast information for use in controlling the drive arrangement 104. The weather forecast information may include, inter alia, one or more forecasted wind speeds and one or more forecasted wind directions.

The weather forecast unit 112 may be spatially located on a shore or a weather ship stationed in an ocean. Accordingly, the weather forecast information may, for example, be communicated to the control arrangement 106 via a satellite communication link or other suitable wireless communication link.

Optionally, the control arrangement 106 may provide the weather forecast unit 112 with information indicative of actual weather conditions faced by the aquatic vessel. Such information may, for example, be used by the weather forecast unit 112 for statistical analysis.

Moreover, the future route information and the weather forecast information may be provided to the control arrangement 106 well in advance. This may enable the control arrangement 106 to determine a forecasted rate and/or a forecasted direction of rotations of each of the Magnus-type rotors 102 as a function of the forecasted wind speeds and/or the forecasted wind directions.

As a result, the control arrangement 106 may have ample time when controlling the drive arrangement 104. This may lead to a significant reduction in power consumed by the propulsion system 100, as compared to conventional propulsion systems. This may, in turn, increase an efficiency of the propulsion system 100.

Moreover, the forecasted rate of rotations of each of the Magnus-type rotors 102 may be determined optimally, for example, so as to maximize power savings by the propulsion system 100. For this purpose, the control arrangement 106 may be operable to determine one or more parameters corresponding to various rates of rotations of the Magnus-type rotors 102, namely to determine one or more parameters corresponding to various rates of rotations of the Magnus-type rotors at a certain apparent wind speed. These parameters may, for example, include a thrust generated by each of the Magnus-type rotors 102 and/or a power applied to the drive arrangement 104 to rotate each of the Magnus-type rotors 102. Based on these parameters, the control arrangement 106 may be operable to calculate power savings made by the Magnus-type rotors 102 corresponding to the various rates of rotations. The control arrangement 106 may then be operable to determine optimally one or more of the various rates of rotations with maximum power savings as the forecasted rate of rotations.

Optionally, the control arrangement 106 may be operable to determine optimally the forecasted rate of rotations using pre-calculated tables and/or curves. Such pre-calculated tables and/or curves may provide an efficient rate of rotation corresponding to different apparent wind speeds and/or apparent wind directions. A pre-calculated table and/or curve may, for example, be calculated using test data on various theoretical models, statistical models, simulated models or combinations thereof.

Additionally or alternatively, the control arrangement 106 may be supplemented with local weather information derived from one or more weather models for use in controlling the drive arrangement 104. These weather models may, for example, be hosted in computing hardware of the control arrangement 106 or another data processing arrangement provided in the aquatic vessel.

The weather models may be operable to divide the future route information into a plurality of route segments. These weather models may then be operable to predict weather conditions for one or more route segments from the plurality of route segments. The weather models may be operable to provide the control arrangement 106 with one or more predicted wind speeds and one or more predicted wind directions. Details of how such weather models may be used have been provided in conjunction with FIG. 3.

Consequently, the control arrangement 106 may be operable to take into account the weather conditions predicted by the weather models. This may further enable the control arrangement 106 to determine the rate of rotations of each of the Magnus-type rotors 102 in such a manner that propulsion provided by the Magnus-type rotors 102 is improved, while power consumption is reduced.

Let us consider an example scenario where a particular vessel speed is set as a target speed of the aquatic vessel. In order to achieve the target speed of the aquatic vessel, the rate of rotations of the Magnus-type rotors 102 may be varied from a current rate to a target rate, for example, when wind conditions change.

Moreover, the Magnus-type rotors 102 may be large in size, and their rotating parts may weigh from a few tonnes to several tonnes. In addition, the rate of rotations of the Magnus-type rotors 102 may be high. Therefore, varying the rate of rotations of the Magnus-type rotors 102 may require a large amount of energy and time. In addition, a power consumed in varying the rate of rotations may be calculated as a ratio of the energy required in varying the rate of rotations to a time required in varying the rate of rotations.

In a first case, let us assume that the control arrangement 106 takes into account the apparent wind speeds and/or the apparent wind directions on an actual basis, for controlling the drive arrangement 104. In a second case, let us assume that the control arrangement 106 takes into account the forecasted wind speeds and/or the forecasted wind directions, for controlling the drive arrangement 104.

It may be assumed that the energy required to vary the rate of rotations from the current rate to the target rate is approximately the same in the first and the second cases. It is evident that the control arrangement 106 has more time for varying the rate of rotations in the second case, as compared to the first case. Therefore, the maximum power consumed during acceleration or deceleration in the second case is substantially lower than the maximum power consumed during acceleration or deceleration in the first case. Beneficially, the maximum power consumed in the second case is lower than the maximum power consumed in the first case.

In this way, the use of the weather forecast information results in an increase in the efficiency of the propulsion system 100.

FIG. 1 is merely an example, which should not unduly limit the scope of the claims herein. It is to be understood that the specific designation for the propulsion system 100 is for the convenience of reader and is not to be construed as limiting the propulsion system 100 to specific numbers, types, or arrangements of the Magnus-type rotors 102 and/or other components of the propulsion system 100. One of ordinary skill in the art would recognize many variations, alternatives, and modifications of embodiments of the present invention.

Figure 2:
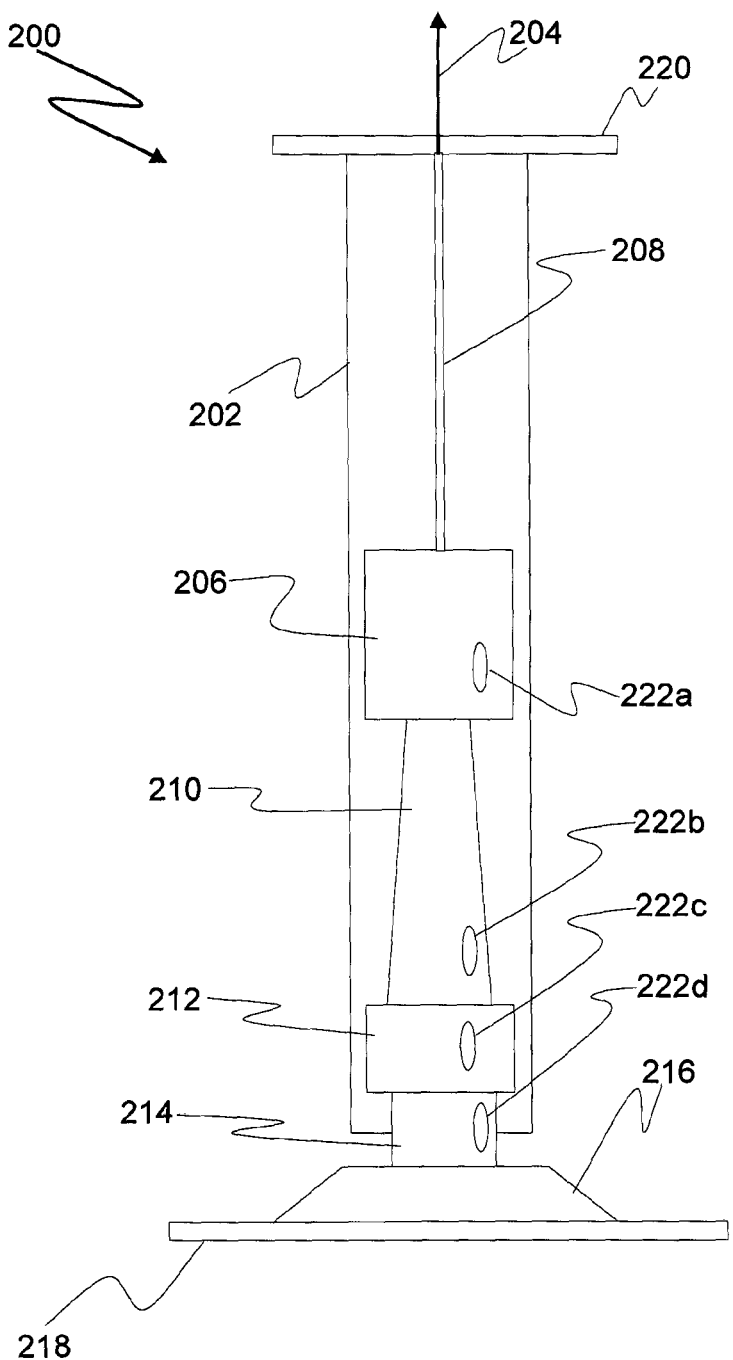
FIG. 2 is a schematic illustration of a Magnus-type rotor and its corresponding set up, in accordance with an embodiment of the present invention.

FIG. 2 is a schematic illustration of a Magnus-type rotor 200 and its corresponding set up, in accordance with an embodiment of the present invention. The Magnus-type rotor 200 could be set up as one of the Magnus-type rotors 102 in the propulsion system 100.

The Magnus-type rotor 200 has a body 202 that is rotated about a substantially upright axis 204 by a drive 206. The drive 206 is spatially located inside the body 202, as shown in FIG. 2.

The drive 206 may, for example, include at least one motor, at least one clutch, and bearings. The at least one motor may be operable to produce a rotary motion. The at least one motor may be attached to a first shaft (not shown in FIG. 2), while the body 202 of the Magnus-type rotor 200 may be attached to a second shaft 208. The at least one clutch may be operable to connect and disconnect the first shaft and the second shaft 208. Consequently, the at least one clutch may be operable to transfer the rotary motion produced by the at least one motor to the body 202 of the Magnus-type rotor 200. Meanwhile, the bearings may provide for free rotation of the body 202 about the substantially upright axis 204.

With reference to FIG. 2, the drive 206 is attached to a first supporting structure 210, which is attached to a second supporting structure 212. The second supporting structure 212 may, for example, have bearings to support the body 202 and the drive 206 during rotations, and to provide for free rotation of the body 202 about the substantially upright axis 204.

As shown in FIG. 2, the second supporting structure 212 is attached to a third supporting structure 214, which is attached to a foundation structure 216. The foundation structure 216 is provided over a portion 218 of a deck of an aquatic vessel. The portion 218 may be spatially located in a proximity of at least one of: one of four corners of the deck, a middle portion of the deck, a stem of the aquatic vessel, or a bow of the aquatic vessel. The portion 218 may be suitably located depending on, for example, a number of Magnus-type rotors that have been set up on the deck of the aquatic vessel, a size of the Magnus-type rotor 200, and/or a size and/or an aerodynamic shape of the aquatic vessel.

In addition, the Magnus-type rotor 200 includes a top plate 220 mounted over an upper end of the body 202. The top plate 220 controls vertical wind flows, thereby improving efficiency of the Magnus-type rotor 200.

In order to produce a Magnus effect to propel the aquatic vessel, the Magnus-type rotor 200 may have a suitable shape and size. The Magnus-type rotor 200 may be cylindrical, spherical, or ellipsoidal in form. However, it may be noted here that the Magnus-type rotor 200 may have other suitable shapes, whose cross-sections may beneficially be circular. With reference to FIG. 2, the Magnus-type rotor 200 is cylindrical in form.

Additionally, the Magnus-type rotor 200 may have an elongate length in a range of 12 meters to 36 meters, and a diameter in a range of 2 meters to 6 meters. In some cases where the aquatic vessel is relatively large and heavy, such as a cargo ship, the Magnus-type rotor 200 may have an elongate length in a range of 12 meters to 60 meters, and a diameter in a range of 2 meters to 10 meters.

Moreover, the Magnus-type rotor 200 may include one or more sensors, depicted as a sensor 222a, a sensor 222b, a sensor 222c and a sensor 222d (hereinafter collectively referred to as sensors 222). The sensors 222 may be attached to various parts of the Magnus-type rotor 200. With reference to FIG. 2, the sensor 222a is attached to the drive 206; the sensor 222b is attached to the first supporting structure 210; the sensor 222c is attached to the second supporting structure 212; and the sensor 222d is attached to the third supporting structure 214.

The sensors 222 may be operable to measure one or more of:
(a) a rate of rotations of the Magnus-type rotor 200,
(b) a direction of rotations of the Magnus-type rotor 200,
(c) an angular acceleration and/or deceleration of the Magnus-type rotor 200,
(d) a power applied to the drive 206 to rotate the Magnus-type rotor 200, and/or
(e) a thrust generated by the Magnus-type rotor 200.
The sensors 222 may, for example, include one or more accelerometers and/or one or more strain gauges.

The sensors 222 may be operable to generate one or more corresponding measurement signals, and to send the corresponding measurement signals to a control arrangement included in a propulsion system of the aquatic vessel. The control arrangement may then be operable to use the corresponding measurement signals to control the drive 206 to vary the rate and/or direction of rotations of the Magnus-type rotor 200.

FIG. 2 is merely an example, which should not unduly limit the scope of the claims herein. It is to be understood that the specific designation for the Magnus-type rotor 200 is for the convenience of reader and is not to be construed as limiting the Magnus-type rotor 200 to specific numbers, types, or arrangements of components of the Magnus-type rotor 200. One of ordinary skill in the art would recognize many variations, alternatives, and modifications of embodiments of the present invention. For example, the drive 206 may be spatially located outside the body 202 in some alternative arrangements.

Figure 3:
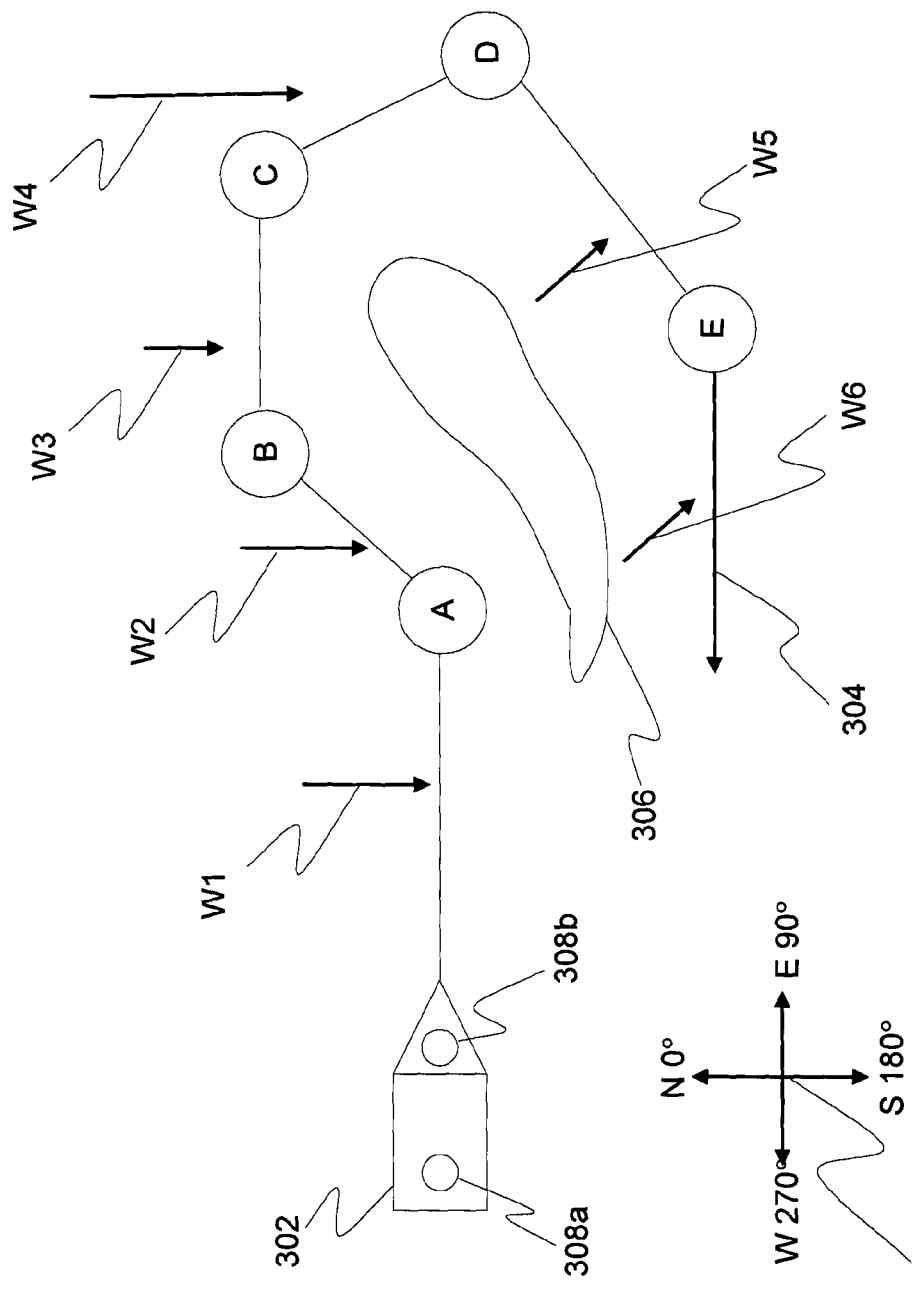
FIG. 3 is an illustration of how a propulsion system may be implemented for an aquatic vessel, in accordance with an embodiment of the present invention.

FIG. 3 is an illustration of how a propulsion system may be implemented for an aquatic vessel 302, in accordance with an embodiment of the present invention. The aquatic vessel 302 is moving along a route 304 in a water body, such as a sea, across an island 306.

The propulsion system of the aquatic vessel 302 includes one or more Magnus-type rotors, depicted as a Magnus-type rotor 308a and a Magnus-type rotor 308b (hereinafter collectively referred to as Magnus-type rotors 308). With reference to FIG. 3, the Magnus-type rotor 308a is spatially positioned in a proximity of a stern of the aquatic vessel 302, while the Magnus-type rotor 308b is spatially positioned in a proximity of a bow of the aquatic vessel 302.

A control arrangement of the propulsion system is provided with the route 304, one or more target vessel speeds along the route 304, measured vessel speeds, measured vessel directions, measured apparent wind speeds, measured apparent wind directions, forecasted wind speeds and/or forecasted wind directions, as described earlier. In addition, the control arrangement may be supplemented with local weather information derived from one or more weather models hosted in computing hardware of the control arrangement.

The weather models may be operable to divide the route 304 into a plurality of route segments. For example, the route segments may be marked with waypoints A, B, C, D and E, as shown in FIG. 3. The weather models may then be operable to predict weather conditions for one or more route segments from these route segments.

Accordingly, the weather models may be operable to determine one or more predicted wind speeds and/or one or more predicted wind directions, depending on the measured apparent wind speeds, the measured apparent wind directions, the forecasted wind speeds and/or the forecasted wind directions. For this purpose, the weather models may be operable to compare the measured apparent wind speeds and/or the measured apparent wind directions with the forecasted wind speeds and/or the forecasted wind directions. Such comparisons may, for example, be made for current or past geographical locations of the aquatic vessel 302. The weather model may then use these comparisons to improve predictions for future geographical locations of the aquatic vessel 302 along the route 304.

Subsequently, the weather models may provide the control arrangement with the predicted wind speeds and the predicted wind directions. With reference to FIG. 3, the predicted wind speeds and the predicted wind directions have been depicted by arrows W1, W2, W3, W4, W5 and W6. The length of these arrows provides an approximate indication of the predicted wind speeds. The predicted wind directions may be indicated relative to a compass 310 shown in FIG. 3.

It may be noted here that the predicted wind speeds and the predicted wind directions may not only vary from one route segment to another route segment, but also within a route segment as a function of place in the route segment or as a function of time. For example, the predicted wind speeds and the predicted wind directions may vary, due to a presence of an object, such as the island 306, in a proximity of the route 304.

Now, let us consider how the predicted wind speeds and the predicted wind directions may be used by the control arrangement when varying a rate of rotations of each of the Magnus-type rotors 308. The control arrangement may use the predicted wind speeds, the predicted wind directions, and the target vessel speeds along the route 304, to determine apparent wind speeds and apparent wind directions relative to the aquatic vessel 302 along the route 304. The control arrangement may then vary the rate of the rotations, along the route 304, as a function of the apparent wind speeds and/or the apparent wind directions.

Let us consider an example table below. The table provides exemplary information pertaining to the target vessel speeds along the route 304, the predicted wind speeds, the predicted wind directions, an optimal rate of rotations and power required when operating at the optimal rate.

| Wind Condition | Vessel Direction (degrees) | Vessel Speed (knots) | Wind Speed (m/s) | Wind Direction (degrees) | Optimal Rate of Rotations (RPM) | Power Required (kW) |
|---|---|---|---|---|---|---|
| W1 | 90 | 19 | 8 | 360 | 250 | 12 |
| W2 | 45 | 19 | 8 | 360 | 220 | 8 |
| W3 | 90 | 15 | 4 | 360 | 145 | 2 |
| W4 | 165 | 15 | 12 | 360 | 165 | 4 |
| W5 | 235 | 15 | 8 | 300 | 240 | 10 |
| W6 | 270 | 19 | 8 | 300 | 0 | 0 |

When the aquatic vessel 302 crosses the waypoint A, the vessel direction changes from 90 degrees to 45 degrees. The target vessel speeds, the predicted wind directions and the predicted wind speeds before and after the waypoint A remain the same. However, due to the change in the vessel direction, the apparent wind speeds and the apparent wind directions change relative to the aquatic vessel 302.

When the aquatic vessel 302 crosses the waypoint B, the vessel direction changes from 45 degrees to 90 degrees. The predicted wind directions before and after the waypoint B remains the same, while the predicted wind speeds and the target vessel speeds decrease after the waypoint B. Accordingly, the apparent wind speeds and the apparent wind directions change relative to the aquatic vessel 302.

Further, when the aquatic vessel 302 crosses the waypoint C, the vessel direction changes from 90 degrees to 165 degrees. The target vessel speeds and the predicted wind directions before and after the waypoint C remain the same, while the predicted wind speeds increase after the waypoint C. Accordingly, the apparent wind speeds and the apparent wind directions change relative to the aquatic vessel 302.

Furthermore, when the aquatic vessel 302 crosses the waypoint D, the vessel direction changes from 165 degrees to 235 degrees. The target vessel speeds before and after the waypoint D remains the same, while the predicted wind directions and the predicted wind speeds change after the waypoint D, for example, due to the presence of the island 306. Accordingly, the apparent wind speeds and the apparent wind directions change relative to the aquatic vessel 302 once again.

It is evident from the above example that the control arrangement may use information about the route 304, the target vessel speeds, the predicted wind speeds and the predicted wind directions, to predict rates of rotations of the Magnus-type rotors 308 to be used along the route 304. Such predictions for the rates of rotations may be made in real time or near real time. These predictions may be made for a predefined period of time, such as for next 5 minutes, 15 minutes, 30 minutes, and so on.

Moreover, such predictions may be made in advance, to allow the control arrangement to vary the rates of rotations of the Magnus-type rotors 308 in ample time. Therefore, power consumed in varying the rates of rotations is substantially reduced. This results in an increase in the efficiency of the propulsion system.

FIG. 3 is merely an example, which should not unduly limit the scope of the claims herein. One of ordinary skill in the art would recognize many variations, alternatives, and modifications of embodiments of the present invention.

Figure 4:
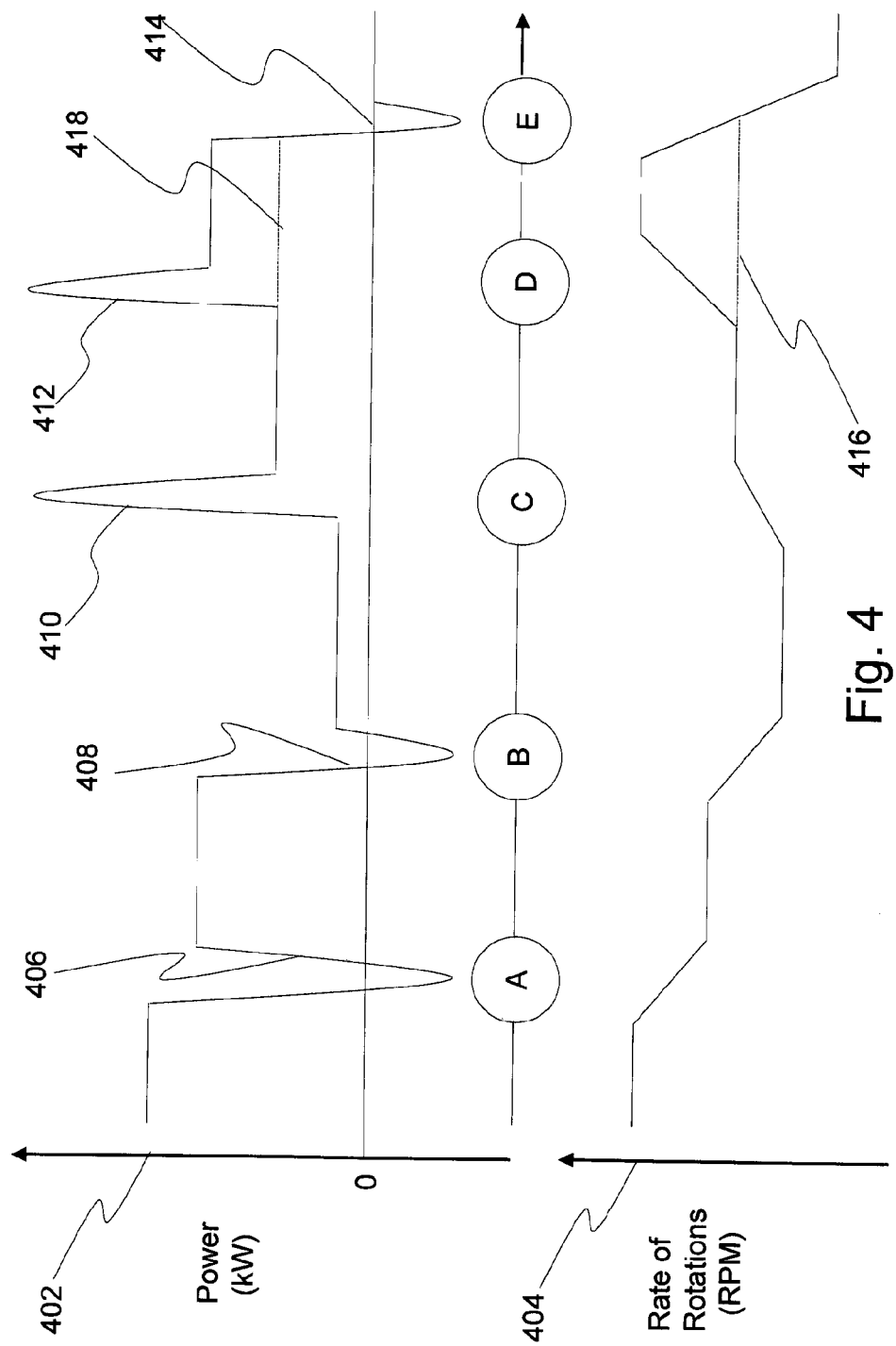
FIG. 4 is an illustration of a power curve and a rate of rotations curve, in accordance with an embodiment of the present invention.

FIG. 4 is an illustration of a power curve 402 and a rate of rotations curve 404, in accordance with an embodiment of the present invention. The power curve 402 and the rate of rotations curve 404 have been drawn corresponding to the example provided in conjunction with FIG. 3. The power curve 402 and the rate of rotations curve 404 may, for example, be used by the control arrangement to determine the rate of rotations for the Magnus-type rotors 308.

In the power curve 402, power required by the Magnus-type rotors 308 has been drawn as a function of the route 304. In the rate of rotations curve 404, the rate of rotations of the Magnus-type rotors 308 has been drawn as a function of the route 304.

It is evident that the power required is high, where the rate of rotations is high. In addition, a positive peak power is drawn during acceleration, i.e., when the rate of rotations is varied from a lower value to a higher value. Similarly, a negative peak power is drawn during deceleration, i.e., when the rate of rotations is varied from a higher value to a lower value.

Optionally, when the Magnus-type rotors 308 decelerate, a momentum of rotation of the Magnus-type rotors 308 may be used to generate electricity. The generated electricity may then be stored in an electric grid of the aquatic vessel. For example, when the rates of rotations are decreased at the waypoints A, B and E, the propulsion system may release power to generate electricity at a negative peak 406, a negative peak 408 and a negative peak 414, respectively.

On the other hand, when the rates of rotations are increased at the way points C and D, significant peak powers are required to accelerate the Magnus-type rotors 308, as indicated by a positive peak 410 and a positive peak 412 in FIG. 4.

Moreover, the Magnus-type rotors 308 may be large in size, and may weigh from a few tonnes to several tonnes. Therefore, acceleration or deceleration of the Magnus-type rotors 308 may take a considerable time, typically ranging from two minutes to 20 minutes, depending on the peak power available from the electricity grid and/or an amount of change required in the rate of rotations.

Therefore, it is desirable that the rates of rotations of the Magnus-type rotors 308 be determined optimally and well in advance. Beneficially, the rates of rotations and the power required may be forecasted for the route 304 either partly or entirely. In addition, an impact of varying the rates of rotations on fuel efficiency of the propulsion system may be estimated.

Moreover, it might be economically reasonable to not accelerate or only partly accelerate the Magnus-type rotors 308, when accelerating the Magnus-type rotors 308 requires significantly high power peaks. In such cases, the power curve 402 may be integrated over an expected time for power usage during a particular part of the route 304, to determine total power required. For example, if the total power required during the expected time is higher than a predefined threshold value, the Magnus-type rotors 308 may not be accelerated or may be accelerated only partly. Otherwise, if the total power required is lower than or equal to the predefined threshold value, the Magnus-type rotors 308 may be accelerated, as required.

Alternatively or additionally, the total power required during the expected time may be determined for a first case in which the rate of rotations is kept constant and a second case in which the rate of rotations is accelerated. A difference between the total power required for the first case and the second case may then be compared with an expected improvement in the fuel efficiency of the propulsion system. If the difference between the total power required for the first and second cases is lower than the expected improvement in the fuel efficiency, the rate of rotations may be accelerated in accordance with the rate of rotations curve 404. Otherwise, if the difference is equal to or more than the expected improvement in the fuel efficiency, the rate of rotations may not be accelerated or may be accelerated only partly.

With reference to FIG. 4, the rate of rotations of the Magnus-type rotors 308 may not be varied after the waypoint D, as indicated by a dashed line 416. In such a case, the power required may be indicated by a dashed line 418.

FIG. 4 is merely an example, which should not unduly limit the scope of the claims herein. One of ordinary skill in the art would recognize many variations, alternatives, and modifications of embodiments of the present invention.

Figure 5:
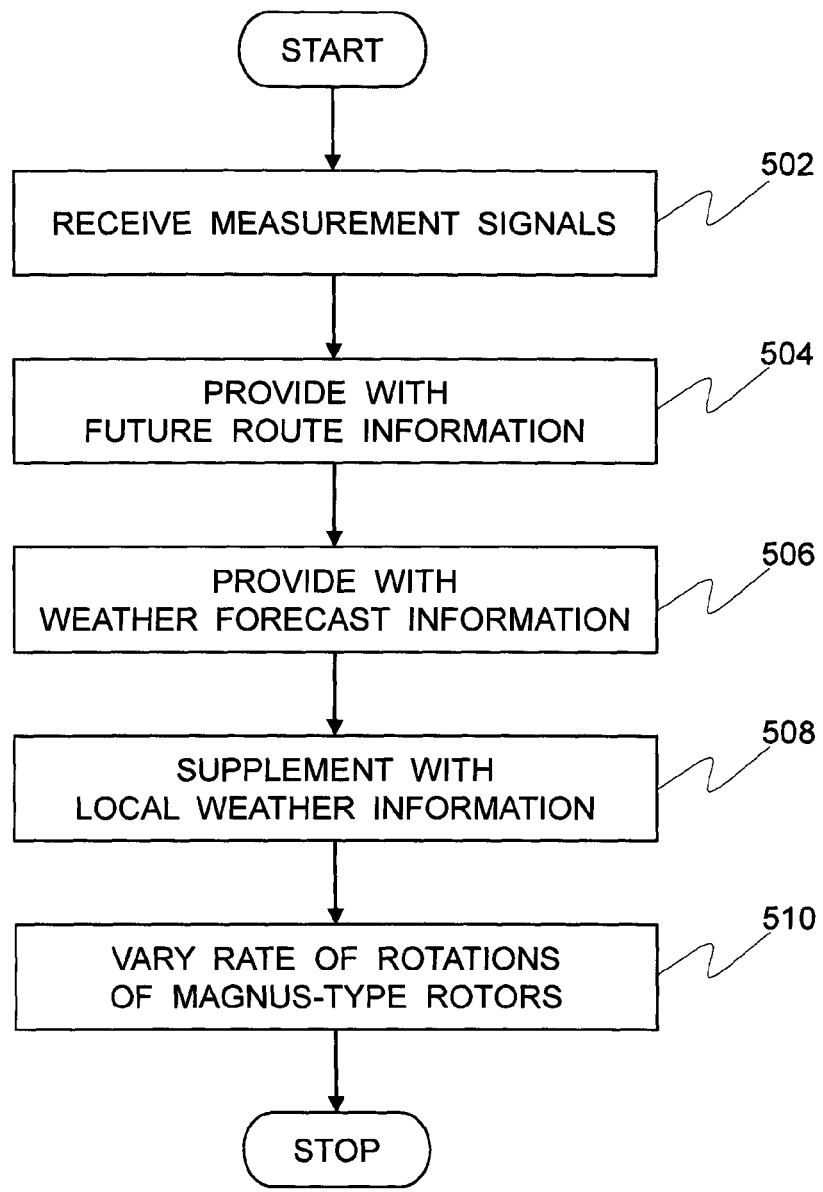
FIG. 5 is an illustration of steps of a method of operating a propulsion system for an aquatic vessel, in accordance with an embodiment of the present invention.

FIG. 5 is an illustration of steps of a method of operating the propulsion system 100 for the aquatic vessel; in accordance with an embodiment of the present invention. The method is depicted as a collection of steps in a logical flow diagram, which represents a sequence of steps that can be implemented in hardware, software, or a combination thereof.

At a step 502, the control arrangement 106 receives the measurement signals generated by the sensors 108. As described earlier, these measurement signals include, inter alia, the measured apparent wind speeds, the measured vessel speeds, the measured apparent wind directions and the measured vessel directions.

At a step 504, the control arrangement 106 is provided with the future route information for the aquatic vessel. The future route information may, for example, be provided via the control panel 110.

As described earlier, the future route information may include detailed navigation instructions, such as the proposed routes that may be used by the aquatic vessel to reach its destination and/or the proposed vessel speeds to be used.

At a step 506, the weather forecast unit 112 provides the control arrangement 106 with the weather forecast information. As described earlier, the weather forecast information may include, inter alia, the forecasted wind speeds and the forecasted wind directions.

The steps 502, 504 and 506 may, for example be performed substantially simultaneously or in any suitable sequence.

Thereafter, at a step 508, the control arrangement 106 is supplemented with the local weather information derived from the weather models, as described earlier.

At a step 510, the control arrangement 106 controls the drive arrangement 104 for varying the rate of rotations of each of the Magnus-type rotors 102, depending on the measurement signals received at the step 502, the future route information provided at the step 504, the weather forecast information provided at the step 506 and/or the local weather information supplemented at the step 508.

The control arrangement 106 determines the rate of rotations of each of the Magnus-type rotors 102 optimally and well in advance, such that the propulsion provided by the Magnus-type rotors 102 is improved, while the power consumption is reduced.

It should be noted here that the steps 502 to 510 are only illustrative and other alternatives can also be provided where one or more steps are added, one or more steps are removed, or one or more steps are provided in a different sequence without departing from the scope of the claims herein.

Embodiments of the present invention can be used for various purposes, including, though not limited to, facilitating improvement in propulsion provided by propulsion systems for aquatic vessels, while reducing the power consumption and the fuel consumption of the aquatic vessels.

Modifications to embodiments of the present invention described in the foregoing are possible without departing from the scope of the present invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

We claim:

1. A propulsion system for an aquatic vessel, wherein the propulsion system includes one or more Magnus-type rotors that are operable to rotate about their respective substantially upright axes, a drive arrangement for rotating the one or more Magnus-type rotors, and a control arrangement for controlling the drive arrangement for varying a rate and/or a direction of rotations of each of the one or more Magnus-type rotors, wherein the control arrangement is operable to receive one or more measured apparent wind speeds and/or one or more measured apparent wind directions, and is additionally provided in operation with one or more forecasted wind speeds and/or one or more forecasted wind directions, further wherein the control arrangement is supplemented with one or more predicted wind speeds and/or one or more predicted wind directions derived from one or more weather models for use in controlling the drive arrangement for improving propulsion provided by the one or more Magnus-type rotors, wherein the one or more weather models are operable to determine the one or more predicted wind speeds and/or the one or more predicted wind directions depending on the one or more measured apparent wind speeds and/or the one or more measured apparent wind directions and the one or more forecasted wind speeds and/or the one or more forecasted wind directions.

2. The propulsion system as claimed in claim 1, wherein the control arrangement is additionally provided in operation with future route information for the aquatic vessel.

3. The propulsion system as claimed in claim 2, wherein the future route information includes a route to be used by the aquatic vessel, and wherein the one or more weather models are operable to divide the route into a plurality of route segments, and to determine the one or more predicted wind speeds and/or the one or more predicted wind directions for one or more route segments from the plurality of route segments.

4. The propulsion system as claimed in claim 3, wherein the one or more weather models are operable to compare the one or more measured apparent wind speeds and/or the one or more measured apparent wind directions with the one or more forecasted wind speeds and/or the one or more forecasted wind directions for current and/or past geographical locations of the aquatic vessel, to improve predictions for future geographical locations of the aquatic vessel along the route.

5. The propulsion system as claimed in claim 3, wherein the one or more weather models are operable to vary the one or more predicted wind speeds and/or the one or more predicted wind directions within a route segment as a function of place in the route segment and/or as a function of time.

6. The propulsion system as claimed in claim 3, wherein the control arrangement is operable to predict rates of rotations of the one or more Magnus-type rotors to be used along the route, using a target vessel speed, the one or more predicted wind speeds and/or the one or more predicted wind directions, in a manner that the propulsion provided by the one or more Magnus-type rotors is improved.

7. The propulsion system as claimed in claim 6, wherein the rates of rotations to be used are predicted in advance, thereby allowing the control arrangement to have ample time to control the drive arrangement for varying the rate of rotations of each of the one or more Magnus-type rotors.

8. The propulsion system as claimed in claim 1, wherein the control arrangement is operable to control the drive arrangement to not accelerate or only partly accelerate the rate of rotations, when a total power required to accelerate the rate of rotations is higher than a predefined threshold value.

9. The propulsion system as claimed in claim 1, wherein the propulsion system includes one or more sensors for measuring one or more of: the rate of rotations of each of the one or more Magnus-type rotors, the direction of rotations of each of the one or more Magnus-type rotors, an angular acceleration and/or deceleration of each of the one or more Magnus-type rotors, a power applied to the drive arrangement to rotate each of the one or more Magnus-type rotors, a thrust generated by each of the one or more Magnus-type rotors, an apparent speed and/or an apparent direction of wind, a speed and/or direction of the aquatic vessel, and/or a geographical location of the aquatic vessel, wherein the one or more sensors are operable to generate one or more corresponding measurement signals for the control arrangement to use when controlling the drive arrangement to vary the rate and/or the direction of rotations of each of the one or more Magnus-type rotors.

10. The propulsion system as claimed in claim 1, wherein the one or more Magnus-type rotors are spherical, ellipsoidal or cylindrical in form.

11. The propulsion system as claimed in claim 1, wherein each of the one or more Magnus-type rotors has an elongate length in a range of 12 meters to 36 meters, and a diameter in a range of 2 meters to 6 meters.

12. The propulsion system as claimed in claim 1, wherein the one or more forecasted wind speeds and/or the one or more forecasted wind directions are communicated to the control arrangement via a satellite communication link.

13. A method of operating a propulsion system for an aquatic vessel, wherein the propulsion system includes one or more Magnus-type rotors that are operable to rotate about their respective substantially upright axes, a drive arrangement for rotating the one or more Magnus-type rotors, and a control arrangement for controlling the drive arrangement for varying a rate and/or a direction of rotations of each of the one or more Magnus-type rotors,
wherein the method includes:
providing the control arrangement with one or more measured apparent wind speeds and/or one or more measured apparent wind directions;
additionally providing the control arrangement in operation with one or more forecasted wind speeds and/or one or more forecasted wind directions;
operating one or more weather models to determine one or more predicted wind speeds and/or one or more predicted wind directions depending on the one or more measured apparent wind speeds and/or the one or more measured apparent wind directions and the one or more forecasted wind speeds and/or the one or more forecasted wind directions; and
supplementing the control arrangement with the one or more predicted wind speeds and/or the one or more predicted wind directions derived from the one or more weather models for use in controlling the drive arrangement for improving propulsion provided by the one or more Magnus-type rotors.

14. The method as claimed in claim 13, wherein the method includes additionally providing the control arrangement in operation with future route information for the aquatic vessel.

15. The method as claimed in claim 14, wherein the future route information includes a route to be used by the aquatic vessel, and wherein the method includes operating the one or more weather models to divide the route into a plurality of route segments, and to determine the one or more predicted wind speeds and/or the one or more predicted wind directions for one or more route segments from the plurality of route segments.

16. The method as claimed in claim 15, wherein the method includes operating the one or more weather models to compare the one or more measured apparent wind speeds and/or the one or more measured apparent wind directions with the one or more forecasted wind speeds and/or the one or more forecasted wind directions for current and/or past geographical locations of the aquatic vessel, to improve predictions for future geographical locations of the aquatic vessel along the route.

17. The method as claimed in claim 15, wherein the method includes operating the one or more weather models to vary the one or more predicted wind speeds and/or the one or more predicted wind directions within a route segment as a function of place in the route segment and/or as a function of time.

18. The method as claimed in claim 15, wherein the method includes operating the control arrangement to predict rates of rotations of the one or more Magnus-type rotors to be used along the route, using a target vessel speed, the one or more predicted wind speeds and/or the one or more predicted wind directions, in a manner that the propulsion provided by the one or more Magnus-type rotors is improved.

19. The method as claimed in claim 18, wherein the rates of rotations to be used are predicted in advance, thereby allowing the control arrangement to have ample time to control the drive arrangement for varying the rate of rotations of each of the one or more Magnus-type rotors.

20. The method as claimed in claim 13, wherein the method includes operating the control arrangement to control the drive arrangement to not accelerate or only partly accelerate the rate of rotations, when a total power required to accelerate the rate of rotations is higher than a predefined threshold value.

21. The method as claimed in claim 13, wherein the method includes:
providing the propulsion system with one or more sensors for measuring one or more of: the rate of rotations of each of the one or more Magnus-type rotors, the direction of rotations of each of the one or more Magnus-type rotors, an angular acceleration and/or deceleration of each of the one or more Magnus-type rotors, a power applied to the drive arrangement to rotate each of the one or more Magnus-type rotors, a thrust generated by each of the one or more Magnus-type rotors, an apparent speed and/or an apparent direction of wind, a speed and/or direction of the aquatic vessel, and/or a geographical location of the aquatic vessel; and
operating the one or more sensors to generate one or more corresponding measurement signals for the control arrangement to use when controlling the drive arrangement to vary the rate and/or the direction of rotations of each of the one or more Magnus-type rotors.

22. The method as claimed in claim 13, wherein the method includes communicating the one or more forecasted wind speeds and/or the one or more forecasted wind directions to the control arrangement via a satellite communication link.

23. A software product recorded on non-transitory machine-readable data storage media, wherein the software product is executable upon computing hardware for implementing the method as claimed in claim 13.

* * * * *